Sept. 29, 1970  L. T. STAATS, SR., ET AL  3,530,654
FRUIT PICKER HEAD
Filed Aug. 14, 1969
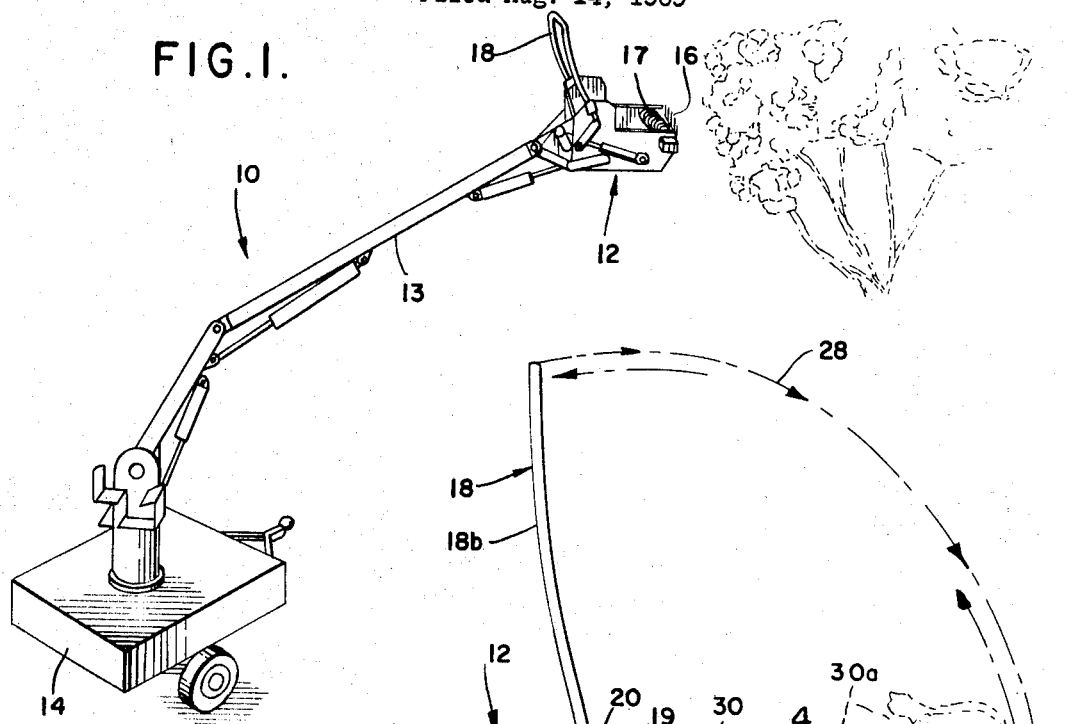
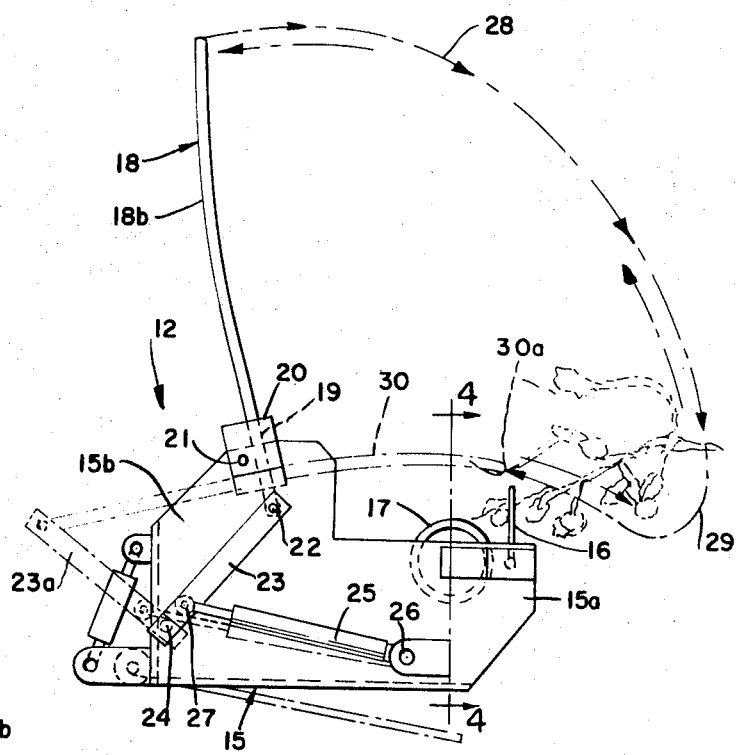
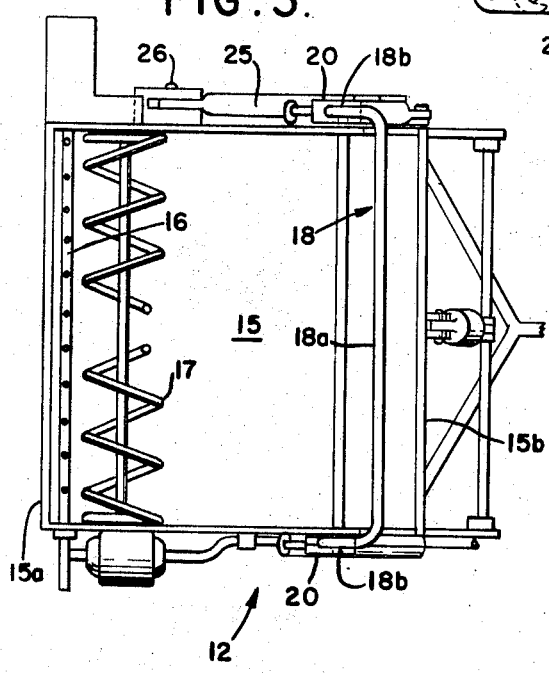
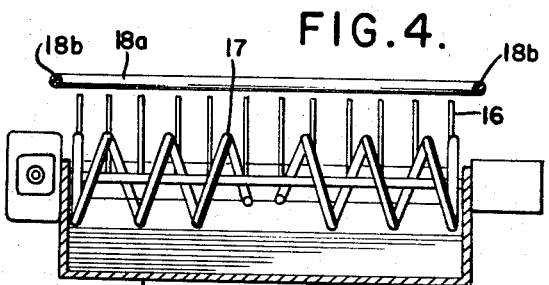
INVENTOR
Louis T. Staats, Sr.
CECIL D. MISENER
FRANK B. INNIS
BY Munson H. Kane
ATTORNEY

United States Patent Office 3,530,654
Patented Sept. 29, 1970

1

3,530,654
FRUIT PICKER HEAD
Louis T. Staats, Sr., Rte. 1, Lincoln University, Pa. 19352; and Cecil D. Misener, 1050 Minnehaha Ave., and Frank B. Innis, 1020 Minnehaha Ave., both of Clermont, Fla. 32711
Continuation-in-part of application Ser. No. 661,649, Aug. 18, 1967. This application Aug. 14, 1969, Ser. No. 850,005
Int. Cl. A01g *19/00*
U.S. Cl. 56—328     11 Claims

ABSTRACT OF THE DISCLOSURE

An open-top receptacle carried by a movable support and provided at its front portion with an upstanding picker comb and with an auger rearwardly of the picker comb so that when the comb engages behind fruit on branches, the fruit is twisted off by the auger. A U-shaped bail is pivotally and slidably connected to the receptacle for movement from a raised position downwardly and forwardly over the picker comb to bring fruit-laden branches into engagement with the comb, whereupon the bail moves rearwardly over the comb to a retracted position adjacent the auger to bring the fruit in contact with the latter.

RELATED APPLICATION

This application is a continuation-in-part of our copending application Ser. No. 661,649, filed Aug. 18, 1967, now Pat. No. 3,475,888, dated Nov. 4, 1969.

This invention relates to new and useful improvements in fruit pickers, particularly citrus fruit pickers of the general type disclosed in our copending application Ser. No. 661,649, filed Aug. 17, 1967.

The fruit picker disclosed in said application comprises a picker head in the form of an open-top receptacle which is carried by a movable support. The front portion of the receptacle is provided with an upstanding, transversely reciprocable picker comb, the teeth of which are adapted to engage behind fruit on branches, and provided rearwardly of the picker comb is a rotatable auger which serves to twist off the fruit engaged by the comb teeth, permitting the fruit to fall into the receptacle.

A picker head of this type works remarkably well on branches which extend downwardly or horizontally outwardly from the tree trunk. However, near the top of the tree the branches slope upwardly and there is a tendency for the picker head receptacle to push these branches further away, so that the fruit thereon is not brought in engagement with the picker comb and auger.

The principal object of the invention is to eliminate this disadvantage, this being attained by providing the picker head with a movable bail which is swingable from a raised position downwardly and forwardly over the picker comb to bring fruit-laden branches into engagement with the comb, whereupon the bail slides rearwardly over the comb to a retracted position adjacent the auger to bring the fruit in contact with the latter.

The movable bail is power-actuated and one of the important features of the invention is the provision of novel means for connecting the bail to the receptacle so that its aforementioned sliding and swinging movement may be sequentially effected.

With the foregoing more important object and feature in view and such other objects and features as may become apparent as this specification proceeds, the invention will be understood from the following descritpion taken in conjunction with the accompanying drawings, wherein like characters of reference are used to designate like parts, and wherein:

2

FIG. 1 is a perspective view showing the picker head of the invention supported by a mobile carrier;
FIG. 2 is a side elevational view of the picker head per se on an enlarged scale;
FIG. 3 is a top plan view of the picker head; and
FIG. 4 is a cross-sectional view, taken substantially in the plane of the line 4—4 in FIG. 2.

Referring now to the accompanying drawings in detail, more particularly FIG. 1, the fruit picker designated generally by the reference numeral 10 is of the type disclosed in our aforementioned application Ser. No. 661,649 and includes a picker head 12 which is carried by a movable support or carrier, as for example, an articulated boom 13 mounted on a mobile base such as a trailer 14, or the like, a detailed description of the boom being unnecessary herein inasmuch as the invention is not concerned therewith.

The picker head 12 comprises an open-top receptacle 15 having a front portion 15a and a rear portion 15b. Here again, the arrangement of the receptacle is substantially the same as in our application Ser. No. 661,649 and therefore need not be described in detail, except to note that the front portion 15a of the receptacle is provided with an upstanding, transversely reciprocable picker comb 16 for engaging behind fruit on branches, while a rotatable auger 17 provided across the open top of the receptacle adjacent to and rearwardly of the picker comb 16 serves to twist off the fruit which then falls into the receptacle.

The present invention resides in the provision of a substantially U-shaped bail 18 which is movably connected to the receptacle and is operative to engage fruit-laden branches, particularly upwardly slanting branches near the top of the tree, so that they are not pushed away when the picker head is brought toward the same and so that they are held in proper position for effective engagement of the fruit thereon by the picker comb and auger.

The U-shaped bail 18 includes a bight portion 18a and a pair of side members 18b, the end portions of the latter remote from the bight portion being slidable in bores 19 provided in a pair of bearing blocks 20. These blocks are disposed at the respective opposite sides of the rear portion 15b of the receptacle 15 and are pivotally connected to these sides of the receptacle, as shown at 21.

It will be noted that the pivot axis 21 of the blocks 20 extends transversely of the receptacle 15, that is, in parallel to the bight portion 18a of the bail, which bight portion is also parallel to the picker comb 16. Thus, the bail as supported by the blocks 20 is swingable about the pivot axis 21 in a plane parallel to the sides of the receptacle. Moreover, it is also capable of a translating or sliding movement in that plane, inasmuch as the bail side members 18b are slidable in the bores 19 which are at right angles to the pivot axis 21 of the blocks 20.

After passing through the bores 19 in the blocks 20, the ends of the bail side members 18b are pivoted as at 22 to one end of a pair of levers 23 which are disposed at the opposite sides of the receptacle 15 and are pivotally connected to these sides at the points 24 which are spaced away from the pivot axis 21 of the blocks 20. Suitable power means are provided for moving the bail, as for example, a hydraulic cylinder 25 which is pivoted to one side of the receptacle 15 as at 26 and have its piston rod pivoted to one of the levers 23 as at 27.

When the cylinder 25 is retracted as shown in FIG. 2, the relationship of the levers 23, blocks 20 and bail side members 18b is such that the bail is in a raised, substantially vertical position above the receptacle 15. As the cylinder 25 commences to be extended, the levers 23 move rearwardly about their pivots 24 and the blocks 20 turn in a clockwise direction (as viewed in FIG. 2) about the pivots 21, with the result that the raised bail 18 is swung downwardly and forwardly as indicated by the arrows 28. This swinging movement of the bail, which may be of a magnitude of approximately 90° or more, causes the bight portion 18a of the bail to engage fruit-laden branches and to press them downwardly into engagement with the picker comb 16 so that the fruit thereon may be effectively twisted off by the auger 17 by the time the movement of the bail is completed as will be presently described.

It may be noted that during the swinging movement of the bail there will be some incidental sliding of the side members 18b in the bores 19 as the pivot axis 22 passes from one side to the other side of an imaginary line or plane extending between the pivot axes 21, 24. In any event, by the time the bail 18 has been swung downwardly and forwardly of the picker comb 16, as for example somewhere in the region of the mark 29 in FIG. 2, further extension of the cylinder 25 will cause the levers 23 to slide the bail members 18b rearwardly in the bores 19 of the blocks 20, inasmuch as by that time the blocks will have rotated about their pivots 21 so as to place the bores 19 in approximate alignment with the direction of movement of the pivots 22.

Thus, the downward swinging movement of the bail will be transformed into a rearward sliding movement over the picker comb 16 to a retracted position of the bail indicated by the dotted lines 30, in which the bail bight portion is closely adjacent to the auger 17 as indicated at 30a and the levers 23 are swung fully rearwardly as shown by the dotted lines 23a. Accordingly, after the fruit-laden branches have been brought down against the picker comb 16 by the downward swinging movement of the bail, the subsequent rearward sliding movement of the bail will assure that the fruit on the branches is effectively engaged by the auger 17 and is twisted off thereby.

The operation of the cylinder 25 is then reversed so that the bail is slid forwardly and then swung upwardly to its initial, raised position, in readiness for the next cycle of operation.

What is claimed as new is:

1. A fruit picker head adapted to be carried by a movable support, said picker head comprising an open-top receptacle having front and rear portions, a picker comb projecting upwardly from the front portion of said receptacle, a rotatable auger mounted across the open top of the receptacle adjacent to and rearwardly of said picker comb, a substantially U-shaped bail movably connected to the rear portion of the receptacle for movement from a raised position downwardly and forwardly over said picker comb and then rearwardly over the picker comb to a retracted position adjacent said auger, and means for moving said bail.

2. The device as defined in claim 1 wherein said bail includes a bight portion substantially parallel to said picker comb and a pair of side members movably connected to opposite sides of said receptacle.

3. The device as defined in claim 2 together with means connecting the side members of said bail to said receptacle for sequential swinging and sliding movement of the side members.

4. The device as defined in claim 3 wherein said connecting means comprise a pair of bearing blocks having pivot means connecting the same to said receptacle for swinging movement about an axis transverse of the receptacle, said blocks also having bores at right angles to the pivot axis, the side members of said bail being slidable in said bores.

5. The device as defined in claim 4 wherein said means for moving said bail include a pair of levers pivoted at one end thereof to opposite sides of said receptacle at points spaced from the pivot axis of said bearing blocks, said levers being pivoted at their other end to the side members of said bail.

6. The device as defined in claim 5 wherein said means for moving said bail also include a fluid operator mounted at one side of the receptacle and connected to one of said levers.

7. A fruit picker head adapted to be carried by a movable support, said picker head comprising an open-top receptacle having front and rear portions, picker means mounted adjacent the front of the receptacle for separating the fruit from a tree and dropping the fruit into the open top receptacle, and a bail movably connected to said receptacle for movement from a raised position downwardly and forwardly over the front of said receptacle and then rearwardly to a retracted position adjacent said picker means, and means for moving said bail.

8. The device as defined in claim 7 wherein said bail includes a bight portion substantially parallel to the front of said receptacle and a pair of side portions movably connected to opposite sides of said receptacle.

9. The device as defined in claim 8 together with means connecting the side members of said bail to said receptacle for sequential swinging and sliding movement of the side members.

10. The device as set forth in claim 9 wherein said connecting means comprises a pair of bearing blocks having pivot means connecting the same to said receptacle for swinging movement about an axis transverse of said receptacle, said blocks having bores offset from said pivot axis, the side members of said bail being slidable in said bores.

11. The device as defined in claim 10 wherein said means for moving said bail include a pair of levers pivoted at one end thereof to opposite sides of said receptacle at points spaced from the pivot axis of said bearing blocks, said levers being pivoted at their other end to the side members of said bail.

References Cited

UNITED STATES PATENTS

| | | | |
|---|---|---|---|
| 309,362 | 12/1884 | Saunders | 56—334 |
| 691,595 | 1/1902 | Carter | 56—333 |
| 1,968,414 | 7/1934 | Melown | 56—334 |
| 3,337,071 | 8/1967 | Clark | 56—328 XR |
| 3,404,521 | 10/1968 | Thorn et al. | 56—328 |
| 3,411,280 | 11/1968 | Burgin | 56—328 |
| 3,475,888 | 11/1969 | Staats et al. | 56—328 |

LOUIS G. MANCENE, Primary Examiner

J. A. OLIFF, Assistant Examiner

U.S. Cl. X.R.

56—333